United States Patent Office 2,880,242
Patented Mar. 31, 1959

2,880,242

PRODUCTION OF TRISUBSTITUTED BORANES

George F. Hennion, South Bend, Ind., assignor, by mesne assignments, to Olin Mathieson Chemical Corporation, a corporation of Virginia No Drawing. Application May 9, 1956
Serial No. 583,609

16 Claims. (Cl. 260—606.5)

This invention relates to improvements in the manufacture of trisubstituted boranes of the type $R_3B$ where R is a hydrocarbon radical and can be aliphatic, alicyclic or aromatic.

The borane products of the process of this invention are generally old compounds of known utility. They have previously been prepared by the Grignard reaction of reagents of the RMgX type in ether solution with boron halides. They have also been prepared as described in U.S. Patent No. 2,446,008 issued July 27, 1948, to Hurd, assignor to General Electric Company. The patented process comprises passing mixed vapors of an organic halide and a boron halide at temperatures of 250 to 400° C. over granular zinc or aluminum.

It has now been found that the substituted boranes can be made advantageously by the direct action of an organic halide and a boron halide with an alkali metal at much lower temperatures than used by Hurd. The process of the present invention is carried out by contacting ethereal solutions of the mixed halides with an alkali metal at temperatures of from about room temperature (20° C.) to 60° C. or higher.

The process of the present invention comprises the addition of the organic halide and boron halide, in suitable proportions, separately or previously mixed, to an alkali metal under a suitable ether. By introducing the two halides in substantially stoichiometric proportions, the formation of undesired by-products and uncontrollable reactions are avoided. The advantages of the prescribed procedure, compared with any other order of addition, include easily controlled reactions, improved yields, adaptability to intermittent or continuous operation and other advantages which appear in the following description.

A particular advantage of the process of the present invention is the discovery that it is not necessary as a preliminary step to prepare an organo-alkali reagent from the organic halide and the alkali metal in ether but that the mixed halides in ethereal solution react with alkali metal to form trisubstituted boranes in good yields. Since, according to the present process, organo-alkali reagents are not prepared before introducing the boron halide, it might be expected that the organic halide would react to form a Wurtz-type hydrocarbon product and the boron halide would be reduced to elemental boron. However, using sodium as the alkali metal, the reaction proceeds substantially according to Equation 1:

(1)   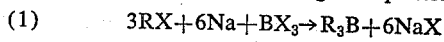

and only minor proportions of the reagents appear to be used in forming by-products by reactions represented by Equations 2 or 3:

(2)   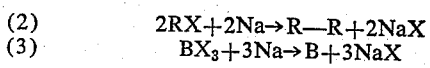
(3)   $BX_3 + 3Na \rightarrow B + 3NaX$

Suitable organic halides include the alkyl halides, arylhalides, and alicyclic halides. The lower alkyl halides are preferred, particularly those having one to five carbon atoms, for example, methyl iodide, ethyl bromide, isopropyl chloride and tertiary butyl chloride. It is one of the advantages of the present invention that heat-labile halides are useful in the process since the use of high temperatures is avoided. Thus, while tertiary butyl chloride could not be used in a process utilizing temperatures of 250° C. or higher because of decomposition to isobutylene and hydrogen chloride, tertiary butyl chloride may be used in the present process. Substituted alkyl halides, for example, benzyl chloride, chloromethyl toluenes or chloromethylnaphthalenes can also be used. Suitable alicyclic halides include cyclohexyl chloride, cyclopentyl bromide and the like. Aryl halides useful in the present process are preferably the more reactive aryl halides such as bromobenzene and alpha bromonaphthalene.

Boron trichloride is the preferred boron halide since it is readily available, reactive and cheaper than other boron halides but boron tribromide, boron trifluoride and their etherates can be used.

The alkali metal is preferably not used in a massive form but in the form of wire, shavings, pellets or as a fine dispersion in an inert medium. Lithium, sodium and potassium are examples of suitable alkali metals. Sodium is preferred as the cheapest, most readily available and easily handled alkali metal.

The reaction of the present invention is carried out in a dry ethereal medium. The lower dialkyl ethers containing not more than five carbon atoms in each alkyl radical are ordinarily preferred but cyclic, non-reactive ethers can also be used. Examples include diethyl ether, di-n-butyl ether and tetrahydrofuran. The higher boiling ethers permit the use of slightly elevated reaction temperatures, e.g. 60° C. or higher. The ethers are suitably dried and/or otherwise purified as, for example, for use in the Grignard reaction.

The stoichiometric ratio of three gram moles of organic halide and six gram atoms of alkali metal per mole of boron halide is preferred but a slight excess (e.g., 10 percent) of either the boron halide or organic halide does not appear to be critical. The proportion of alkali metal should be sufficient to combine with all the halogen of both the halide reagents. The ether reaction medium is used in convenient proportions but the amount is not critical. To avoid unnecessary handling and recovery, the concentration of reactants and products can be, for example, about 40 percent but more or less concentrated solutions (e.g., 10 percent to 60 percent) can also be used.

Procedurally, it is convenient to dissolve the two halide reactants in separate or the same ether solution in suitable proportions and introduce them into a reaction vessel containing the alkali metal which may be covered with ether. Vigorous stirring of the reaction mixture is important in speeding the rate of reaction. The heat of reaction may be sufficient to cause the ether to reflux but additional heat may be supplied to speed the reaction. In a continuous system, provision may be made for intermittent replenishing of the alkakli metal, continuous introduction of halide reactants and continuous removal of the reaction mixture. Sufficient contact time should be provided to complete the reaction while the solution is in contact with the metal. The effluent stream is suitably filtered to remove the alkali metal halide, fractionated to recover the trisubstituted borane, recycling the solvent and unreacted halides to the reaction zone.

In the batch system, it is an advantage of the present process that it may be interrupted at any time and restarted as desired without any deleterious effect. No hazardous organo-metallic solutions need be stored at any time.

Yields are usually above about 60 percent but may vary from about 40 to 80 percent or more. Some organic halides generally give better yields than others as illustrated in the following examples.

*Example I*

A 2-liter reaction vessel fitted with stirrer, reflux condenser and dropping funnel was charged with 82 g. (3.6 gram moles) of sodium which was covered with 100 ml. of anhydrous ether. A slow stream of nitrogen gas was passed through the reaction vessel during the reaction. Into the dropping funnel was placed a mixture of 176.6 g. (1.86 gram moles+5 percent excess) of n-butyl chloride and 73.5 g. (0.62 gram mole) of boron trichloride previously dissolved in 250 ml. of anhydrous ether. A small portion of the halide solution was introduced to the flask and the mixture refluxed for 1 hour to start the reaction. The mixed halides solution was added slowly, maintaining the mixture at reflux temperature. Stirring was continuous. When the addition of the halides solution was complete, an additional 400 ml. of ether was added and the mixture was stirred under reflux for 6 additional hours. Any unreacted sodium was converted to ethoxide by the addition of 200 ml. of ethyl alcohol followed by water to dissolve the by-product caustic and sodium chloride. The ether layer was removed under nitrogen and the aqueous layer twice extracted with 200 ml. portions of ether. The combined extracts were dried over anhydrous calcium chloride and the ether was removed by distillation. The residue was fractionally distilled through a 50 cm. glass helix packed column under an atmosphere of nitrogen. The fraction, boiling at 210–213° C., amounted to 32.6 g. of tri-n-butyl-borane obtained in a yield of 36 percent.

*Example II*

A 2-liter reaction vessel fitted with stirrer, reflux condenser and dropping funnel was charged with 82 g. (3.6 gram moles) of sodium which was covered with 100 ml. of anhydrous ether. A slow stream of nitrogen gas was passed through the reaction vessel during the reaction. Into the dropping funnel was placed a mixture of 267 g. (1.86 gram moles+5 percent excess) of n-butyl bromide and 42 g. (0.62 gram mole) of boron trifluoride previously dissolved in 250 ml. of anhydrous ether. The mixed halides solution was added slowly, maintaining the mixture at reflux temperature. Stirring was continuous. When the addition of the halides solution was complete, the mixture was stirred under reflux for 6 additional hours and stirred overnight without heating. Any unreacted sodium was converted to ethoxide by the addition of ethyl alcohol followed by water sufficient to dissolve the by-product caustic and sodium fluoride. The ether layer was removed under nitrogen and the aqueous layer twice extracted with 200 ml. portions of ether. The combined extracts were dried over anhydrous calcium chloride and the ether was removed by distillation. The residue was fractionally distilled through a 50 cm. glass helix packed column under an atmosphere of nitrogen. The fraction boiling at 200–213° C., amounted to 14.2 g. of tri-n-butyl-borane obtained in a yield of 15 percent.

*Example III*

A two liter, three necked flask fitted with stirrer, reflux condenser and dropping funnel was flask flamed with nitrogen passing through to remove moisture and oxygen. Lithium shavings (20.8 g.; 3 gram atoms) were introduced and covered with 100 ml. of anhydrous ether. A mixture of 184.5 g. (1.5 moles) of n-propyl bromide, 58.6 g. (0.5 mole) of boron trichloride and 450 ml. of anhydrous ether was added at a rate sufficient to maintain gentle reflux. After the addition was complete, the mixture was stirred for three hours and then refluxed with stirring for 3 more hours, after which it was hydrolyzed with sufficient water to dissolve all the salts. The upper ether layer was removed under nitrogen and the aqueous layer was extracted with two 200 ml. portions of ether. The combined ether solutions were dried over calcium chloride and the ether was removed by distillation. The residue was distilled through a 60 cm. glass-helix packed column. The yield of tri-n-propylborane was 88.5 g. or 63.2 percent of theory. B.P. 156° C.

*Example IV*

A two liter, three necked flask fitted with stirrer, reflux condenser and dropping funnel was flask flamed with nitrogen passing through to remove moisture and oxygen. Lithium shavings (10.5 g.; 1.5 gram atoms) were introduced and covered with 200 ml. of anhydrous ether. A mixture of 84.5 g. (0.75 mole) of chlorobenzene, 36.0 g. of boron trifluoride etherate (0.25 mole of boron trifluoride) and 400 ml. of anhydrous ether was added at a rate sufficient to maintain gentle reflux. After the addition was complete, the mixture was hydrolyzed with sufficient water to dissolve all the salts. The upper ether layer was removed under nitrogen and the aqueous layer was extracted with two 200 ml. portions of ether. The combined ether solutions were dried over calcium chloride and the ether was removed by distillation. The residue was crystallized from carbon tetrachloride to obtain 30.5 g. (50.5 percent of theory) of triphenyl-borane, M.P. 137° C.

*Example V*

A three liter, three necked flask fitted with stirrer, reflux condenser and dropping funnel was charged with 69 g. (3 gram atoms) of sodium shavings covered with 200 ml. of anhydrous ether. A mixture of 235 g. (1.5 moles) of bromobenzene, 58.6 g. (0.5 mole) of boron trichloride and 450 ml. of anhydrous ether was added at a rate sufficient to maintain gentle reflux. After the addition was complete, the mixture was stirred under reflux for an additional five hours. Sufficient water to dissolve all the salts was added. The upper ether layer was removed under nitrogen and the aqueous layer was extracted with two 200 ml. portions of ether. The combined ether solutions were dried over calcium chloride and the ether was removed by distillation. The residue was crystallized from carbon tetrachloride to obtain 60 g. (49 percent theory) of triphenylborane, M.P. 136° C.

The trisubstituted boranes are known and used for many purposes. As described by Hughes et al., Ind. Eng. Chem. 43, 284-4 (1951), the incorporation of tributylborane or other trisubstituted boranes in motor fuels reduce the increase in octane requirement of internal combustion engines using such fuels. According to U.S. Patent 2,267,701 to Leum, the cetane number of diesel fuels is raised by the addition of trisubstituted boranes thereto. The oxidation stability of motor fuels is improved by the incorporation of trisubstituted boranes in the form of their addition compounds with organic amines according to U.S. Patent 2,257,194 issued to Rosen. In addition the trisubstituted boranes are useful synthetically. For example, Hurd, J. Org. Chem. 13, 711-3 (1948), describes the preparation of lithium tetramethyl borate, $LiB(CH_3)_4$ from lithium methyl and trimethylborane in ether. Meerwein et al., J. prakt. Chem. 147, 226–55 (1936), describe several synthetic reactions of trialkyl boranes with aldehydes and organic acids.

I claim:

1. A method for the manufacture of boranes of the formula $R_3B$ which comprises introducing an ether solution of both a compound of the formula $BX_3$ and a compound of the formula $RY$ into a mixture of alkali metal and an ether maintained at a temperature of about 20° C. to 60° C., R being a hydrocarbon radical selected from the group consisting of lower alkyl radicals, alicyclic radicals having from 5 to 6 carbon atoms, and aromatic radicals having from 6 to 11 carbon atoms, and X and Y being halogen atoms.

2. The method of claim 1 wherein $BX_3$ is boron trichloride.

3. The method of claim 1 wherein $BX_3$ is boron trifluoride.

4. The method of claim 1 wherein RY is a lower alkyl halide.

5. The method of claim 1 wherein RY is normal butyl chloride.

6. The method of claim 1 wherein RY is normal butyl bromide.

7. The method of claim 1 wherein RY is normal propyl bromide.

8. The method of claim 1 wherein RY is monochlorobenzene.

9. The method of claim 1 wherein said alkali metal is sodium.

10. The method of claim 1 wherein said alkali metal is lithium.

11. The method of claim 1 wherein said ether is a lower dialkyl ether.

12. The method of claim 1 wherein said ether is diethyl ether.

13. The method of claim 1 wherein $BX_3$ is boron trichloride, wherein RY is normal butyl chloride, wherein said alkali metal is sodium and wherein said ether is diethyl ether.

14. The method of claim 1 wherein $BX_3$ is boron trifluoride, wherein RY is normal butyl chloride, wherein said alkali metal is sodium and wherein said ether is diethyl ether.

15. The method of claim 1 wherein $BX_3$ is boron trichloride, wherein RY is normal propyl bromide, wherein said alkali metal is lithium and wherein said ether is diethyl ether.

16. The method of claim 1 wherein $BX_3$ is boron trifluoride, wherein RY is monochlorobenzene, wherein said alkali metal is lithium and wherein said ether is diethyl ether.

References Cited in the file of this patent

UNITED STATES PATENTS 2,446,008    Hurd _____ July 27, 1948

OTHER REFERENCES

Sidgwick: "Chemical Elements and Their Compounds," vol. I, Oxford Univ. Press, London (1950), page 363.